May 26, 1964 G. KIPER 3,134,312
FLASH CIRCUITS FOR CAMERAS
Filed Aug. 8, 1962
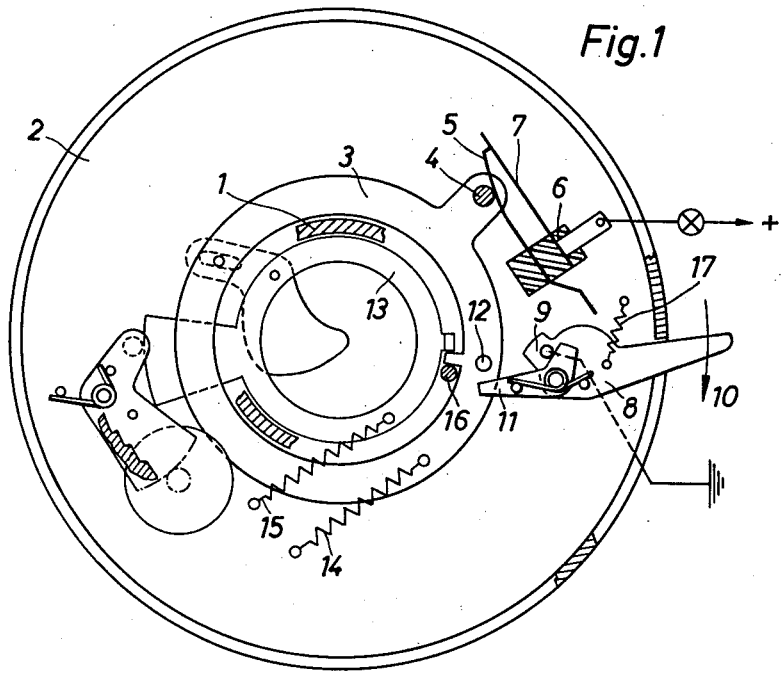
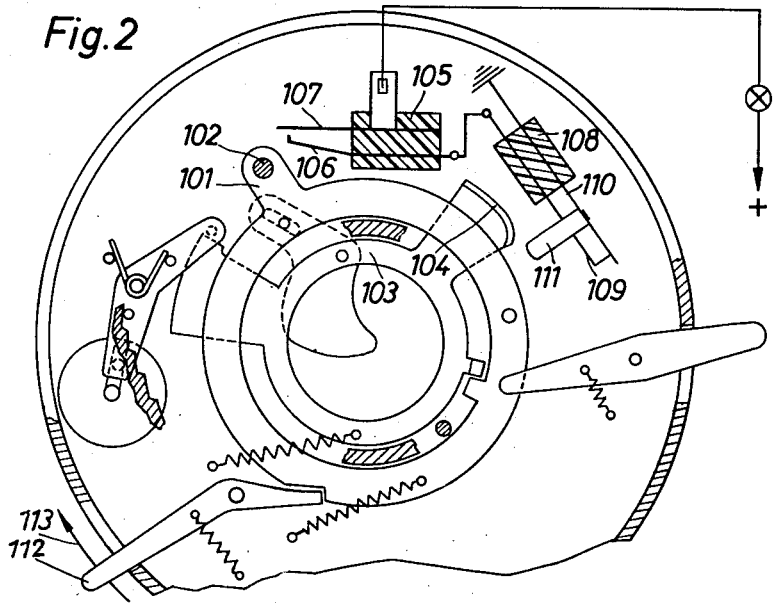
INVENTOR.
GERD KIPER
BY
Michael S. Striker

United States Patent Office 3,134,312
Patented May 26, 1964

3,134,312
FLASH CIRCUITS FOR CAMERAS
Gerd Kiper, Unterhaching, near Munich, Germany, assignor to Agfa Aktiengesellschaft, Leverkusen, Germany
Filed Aug. 8, 1962, Ser. No. 215,575
Claims priority, application Germany Aug. 9, 1961
6 Claims. (Cl. 95—11.5)

The present invention relates to cameras.

More particularly, the present invention relates to cameras capable of operating with flash illumination and in particular to the structure by which the circuit for the electrical flash structure cooperates with the shutter of the camera.

In cameras of the above type which are provided with a between-the-lens shutter, it is conventional to provide in the circuit of the flash apparatus a switch which is closed by the shutter mechanism when this mechanism reaches a position where the shutter is open, and then this very same switch is opened when the shutter reaches its closed position, so that in this way the flash will be provided when the shutter is in open position.

Structure of the above type provides certain problems which have not yet been solved. Thus, the switch member which is actuated in order to open the circuit when the shutter closes is often in the form of a springy member which must be moved in opposition to its own inherent resiliency in order to open the switch, and as a result it is necessary to provide the shutter element which opens the switch with a force greater than would otherwise be required so that it will be possible to open the switch, and as a result the operation of the shutter itself is undesirably influenced. Furthermore, with structures of this type it does not infrequently happen that as a result of the impact between the elements there is an undesirable rebounding so that the structure is not suitable for use with electronic flash, for example, where extremely short exposure times are also required.

It is accordingly a primary object of the present invention to provide a structure which will avoid the above-discussed drawbacks of the conventional structure by providing a shutter and electrical circuit for the flash assembly which cooperate with each other in such a way that the shutter itself can operate without any undesirable influences thereon as a result of the necessity of controlling the circuit for the flash apparatus.

Still another object of the present invention is to provide a structure of the above type which can reliably operate without any possibility of undesirable recoiling or rebounding of the parts so that the structure of the invention can be used with electronic flash as well as for extremely short exposure times.

It is furthermore an object of the present invention to provide a structure of the above type which is extremely simple and inexpensive while at the same time being very reliable in operation and being capable of being incorporated into conventional cameras without any difficulty.

With the above objects in view the invention includes, in a camera, a shutter means movable between open and closed positions and an electrical circuit for a flash assembly, this electrical circuit including a pair of switch means one of which is closed by the shutter means when the latter reaches its open position and the other of which is also closed by the shutter means only during the period when the first-mentioned switch means has initially been closed upon reaching of the open position of the shutter means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of one possible embodiment of a structure according to the present invention; and FIG. 2 is a diagrammatic illustration of another embodiment of a structure according to the present invention.

According to the embodiment of the invention which is illustrated in FIG. 1, the shutter means includes a pair of shutter rings the ring 3 of which is a leading ring while the ring 13 of the pair of shutter rings is a trailing ring. The shutter means also includes the manually operable structure for cocking and then automatically releasing the shutter, this latter manually operable structure including the lever 8 which is accessible to the operator for actuating the shutter. With this shutter means cooperates an electrical circuit of a flash apparatus, this circuit being shown diagrammatically in FIG. 1 and including, in accordance with the present invention a pair of switches which are connected in series with each other and which are normally open switches. The switches are respectively actuated by the leading ring 3 and the handle 8 of the shutter means. The shutter means is shown in FIG. 1 in its rest position where the shutter is closed. The structure shown in FIG. 1 includes the central tube 1 of the objective, this tube being surrounded by the shutter housing 2. The tube 1 is surrounded by the ring 3 which forms a leading ring of the shutter means, as pointed out above. The ring 3 includes a portion 4 in the form of a pin made of an electrically non-conductive material, and this pin is adapted to engage the springy switch member 5 for placing the latter in engagement with the switch member 7 so as to close the switch 6, as illustrated in FIG. 1, the springy contact members 5 and 7 of the switch 6 being placed in their engaged position closing the switch 6 when the ring 3 has reached its rest position shown in the drawing. The spring 14 is operatively connected to the ring 3 for urging the latter to the illustrated rest position where an inner projection of the ring 3 engages a stationary stop member 16. The contact 7 of the switch 6 is connected to a positive pole of the circuit, and the switch members 5 and 7 are insulated from ground so that the circuit will not be complete when the swtich member 5 engages the switch member 7. In order to close the circuit it is necessary for a second switch means thereof to be closed, and this second switch means is formed by the portion of the springy contact member 5 which extends beyond the switch 6 to the side thereof opposite from that at which the member 7 is located, and this latter portion of the member 5 is adapted to be engaged by a projection 9 of the lever 8 so as to close the second switch means and thus close the circuit, the member 8 of course being connected to ground so that as soon as the projection 9 thereof engages the free end of the switch member 5 the second switch means will be closed, this second switch means also being a normally open switch as shown in FIG. 1, and thus the circuit will be complete when both of these switch means are simultaneously closed.

In order to actuate the shutter means of FIG. 1 the operator will manually turn the lever 8 in the direction indicated by the arrow 10 in FIG. 1. This lever 8 is pivotally supported intermediate its ends by a portion of the shutter structure and a second lever is pivotally connected to the lever 8 in a manner well known in the art so as to turn therewith. This second lever 11 will, during turning of the lever 8 in the direction of the arrow 10 by the operator, engage the pin 12 so as to turn the ring 3 in opposition to the spring 14 and thus tension the latter.

It will be noted that the inner projection of the ring 3 which engages the stop 16 will now move away from the stop 16, and this same projection engages a projection of the trailing ring 13 so that the latter necessarily turns with the ring 3 and thus the spring 15 which urges the ring 13 in a clockwise direction, as viewed in FIG. 1, also becomes tensioned. Of course, at this time both of the rings 3 and 13 move together as a unit so that the shutter remains closed, the shutter blades being pivotally connected to the ring 13 and having a pin-and-slot connection with the ring 3 so that when there is relative turning between these rings the shutter blades will be turned between open and closed positions in a manner well known in the art. Furthermore, as is also well known in the art and as is shown diagrammatically at the left portion of FIG. 1 a retarding mechanism cooperates with the trailing ring 13 so as to provide a selected exposure time.

The operator will continue to turn the lever 8 of the shutter means of FIG. 1 in the direction of the arrow 10 until the tip of the lever 11 rides off the pin 12, and then this spring 14 will immediately return the ring 3 to its starting position while the retarding mechanism will retard the return of the trailing ring 13 to its starting position shown in FIG. 1, so that the turning of the ring 3 with respect to the ring 13 at this time will cause the blades to be turned and will thus place the shutter means in its open position. Before the tip of the lever 11 rides off the pin 12 so as to automatically release the shutter to make the exposure the projection 9 will have engaged the free end of the springy contact member 5, and thus the above-mentioned second switch means of the electrical circuit will have already been closed by the time the leading ring 3 is released to the spring 14, so that when the ring 3 reaches its starting position and the shutter is open the electrically non-conductive pin 4 will act on the member 5 to close the switch 6 and the operator will at this time still retain the lever 8 in the position where its projection 9 places the switch member 5 in electrical contact with the ground, so that as a result immediately when the ring 3 returns to its starting position to place the shutter in its open position the circuit through the flash apparatus will be completed and the flash will be ignited. Of course, the operator releases the lever 8 immediately thereafter so that the projection 9 moves away from the member 5 and of course the circuit is now opened. A spring 17 acts on the lever 8 to return it to the illustrated starting position. The ring 13 is returned by the spring 15 to its starting position after the shutter has remained open for the preselected exposure time, as is well known in the art.

Thus, it will be seen that with the structure of FIG. 1 the electrical circuit includes a pair of switch means which are both normally open and which are in series with each other and the one switch means formed by the elements 5 and 7 is placed by the leading ring 3 in its closed position while the other switch means is placed by the shutter means also in a closed position during the initial moments when the first switch means has been closed, so that the flash will be ignited.

In the embodiment of the invention which is illustrated in FIG. 2, the shutter also includes leading and trailing shutter rings which operate similarly to the rings 3 and 13 described above. Thus the illustrated shutter means includes a leading ring 101 and a trailing ring 103, the latter being acted upon in a known way by a retarding mechanism to provide a selected exposure time, and a pair of springs respectively cooperate with the rings 101 and 103 for urging the latter to their starting positions as described above. These rings are shown in FIG. 2 in the position they take when the shutter has been cocked. A manually operable lever is available to the operator for placing the shutter rings in the position shown in FIG. 2 where the shutter is cocked, and in order to release the shutter the operator will turn the lever 112 in the direction of the arrow indicated in FIG. 2 so that the leading ring 101 will be released to the force of the spring which urges the latter back to its starting position, and thus the shutter will be placed in its open position.

The leading shutter ring 101 carries a pin 102 made of an electrically non-conductive material, and the trailing ring 103 fixedly carries a control lug 104. The pin 102 cooperates with the springy contact member 106 of a normally open switch 105 which includes also the contact member 107, so that when the ring 101 returns to its starting position the pin 102 will place the contact member 106 in engagement with the contact member 107 so as to close the switch 105. In series with the switch 105 is a second switch 108 which includes the springy contacts 109 and 110, and the contact 110 carries a projection 111 made of an electrically non-conductive material which is engaged by the lug 104 when the ring 103 returns to its starting position, the lug 104 acting on the projection 111 to displace the springy contact member 110 out of engagement with the springy contact member 109, so that in this way the switch 108 will be opened. Thus, in the construction shown in FIG. 2 the switches 105 and 108 are also connected in series, the contact 106 being directly connected to the contact 109, but the switch 108 is a normally closed switch which is positively maintained in its open position by the lug 104 when the trailing shutter ring 103 is in its rest or starting position.

Thus, with the embodiment of FIG. 2 when the shutter is cocked the lug 104 moves away from the projection 111 so that the normally closed switch 108 is released to be placed in its closed position and the pin 102 moves away from the contact 106 so that the normally open switch 105 assumes its open position. Then when the operator actuates the lever 112 so as to release the shutter in order to make an exposure the leading ring 101 will be returned by the spring which acts thereon to a starting position and the pin 102 will act on the member 106 to place it in engagement with the member 107 so as to close the switch 105, and at this time the switch 108 is still closed since the ring 103 has not yet returned to its starting position since it is acted upon by the retarding mechanism to provide the selected exposure time. It is only when the trailing ring 103 returns to its starting position that the lug 104 acts on the projection 111 so as to open the switch 108 and thus open the circuit of the flash apparatus. Thus, with the structure of FIG. 2 also through a pair of series-connected switch means the flash circuit can be controlled.

The relationship between the springy contacts 106, 107 of the switch 105, the springy contacts 109, 110 of the switch 108, and the pin 102 as well as the lug 104 is such that during cocking of the shutter when the rings 101 and 103 turn as a unit in a counterclockwise direction, as viewed in FIG. 2, the pin 102 moves away from the member 106 so that the switch 105 assumes its normally open position before the lug 104 moves away from the element 111 to allow the switch 108 to assume its normally closed position, so that it is not possible for the circuit to be completed during cocking of the shutter.

Of course, the invention is not limited to the specific types of shutter means shown in FIGS. 1 and 2 and described above. For example, the invention also can be used with that type of shutter where the shutter is open and closed by a ring which turns first in one direction and then in an opposite direction, and with this type of construction the shutter circuit can be controlled by the driving structure which moves such a ring first to the open position as well as by the driving structure which moves the ring back in order to close the shutter.

It will be understood that each of the elements described above, or two or more together, may also find a useful application in other types of cameras differing from the types described above.

While the invention has been illustrated and described as embodied in cameras with flash circuits, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, shutter means including a pair of shutter rings one of which is a leading ring and the other of which is a trailing ring, said rings moving together from rest positions thereof, respectively, to cocked positions, respectively, while said shutter means remains closed and said leading ring moving in advance of said trailing ring from said cocked position of said leading ring back to said rest position thereof for opening said shutter means; and an electrical circuit for a flash apparatus, said electrical circuit including a first switch means and a second switch means which are connected in series and both of which must be closed for completing said electrical circuit to ignite the flash apparatus, said first switch means being normally open and being maintained closed by a portion of said leading ring when the latter is in said rest position thereof, so that said first switch means is closed by said leading ring upon return of the latter to said rest position for opening said shutter means, and said second switch means being closed when said trailing ring is in said cocked position thereof so that the flash apparatus is ignited upon return of said leading ring to said rest position thereof.

2. In a camera as recited in claim 1, said first switch means being engaged by said portion of said leading ring only when the latter is in the region of said rest position thereof so that said leading ring moves freely from said cocked to said rest position thereof before closing said first switch means.

3. In a camera, in combination, shutter means including a pair of shutter rings one of which is a leading ring and the other of which is a trailing ring, said rings moving together from rest positions thereof, respectively, to cocked positions, respectively, while said shutter means remains closed and said leading ring moving in advance of said trailing ring from said cocked position of said leading ring back to said rest position thereof for opening said shutter means; an electrical circuit for a flash apparatus, said electrical circuit including a first switch means and a second switch means which are connected in series and both of which must be closed for completing said electrical circuit to ignite the flash apparatus, said first switch means being normally open and being maintained closed by a portion of said leading ring when the latter is said rest position thereof, so that said first switch means is closed by said leading ring upon return of the latter to said rest position for opening said shutter means, and said second switch means being closed when said trailing ring is in said cocked position thereof so that the flash apparatus is ignited upon return of said leading ring to said rest position thereof; and manually operable means coacting with said shutter means for moving said rings thereof from said rest to said cocked positions, respectively, said second switch means being open when said rings are in their rest positions and assuming a closed position in said cocked positions of said rings in response to movement of said rings to said cocked positions thereof by said manually operable means.

4. In a camera as recited in claim 3, said second switch means being normally open and including a pair of contact portions one of which forms part of said manually operable means and engages the other to close said second switch means when said manually operable means has moved said rings from said rest to said cocked positions thereof.

5. In a camera as recited in claim 3, said second switch means being normally closed and said trailing ring having a projection engaging a part of said second switch means to maintain the latter open when said trailing ring is in said rest position thereof, said projection of said trailing ring moving away from said part of said second switch means to release the latter for movement to said normally closed position thereof during movement of said rings to said cocked positions thereof by said manually operable means.

6. In a camera as recited in claim 1, said first switch means including a stationary contact and a movable contact normally spaced from said stationary contact and said leading ring having a projection which displaces said movable contact into engagement with said stationary contact when said leading ring is in the region of said rest position thereof.

References Cited in the file of this patent

UNITED STATES PATENTS

| | | |
|---|---|---|
| 2,566,202 | Hodges | Aug. 28, 1951 |
| 2,578,604 | Santoni | Dec. 11, 1951 |
| 2,890,640 | Noack | June 16, 1959 |